United States Patent [19]

Sigal

[11] 3,843,304
[45] Oct. 22, 1974

[54] MOLDING PRESS

[76] Inventor: Michael R. Sigal, 256 Friedensburg Rd., Mt. Penn, Pa. 19606

[22] Filed: July 5, 1973

[21] Appl. No.: 376,750

[52] U.S. Cl............ 425/411, 425/450 R, 425/817 R
[51] Int. Cl............................................... B29c 3/00
[58] Field of Search........... 425/406, 407, 410, 411, 425/338, 352, 450 R, 177, 4 R, 817 R, DIG. 127, DIG. 128, DIG. 131, 432, 421, 456; 264/71

[56] References Cited
UNITED STATES PATENTS

| | | | |
|---|---|---|---|
| 1,567,766 | 12/1925 | Stacy | 425/406 |
| 2,588,151 | 3/1952 | Nelson et al. | 425/406 |
| 2,913,766 | 11/1959 | Haller | 425/411 X |
| 2,921,355 | 1/1960 | Gould et al. | 425/411 X |
| 3,517,411 | 6/1970 | Staples | 425/411 X |
| 3,606,633 | 9/1971 | Engelmann | 425/432 |
| 3,639,552 | 2/1972 | Michal | 425/432 X |
| 3,640,660 | 2/1972 | DeMets | 425/411 X |

Primary Examiner—R. Spencer Annear
Assistant Examiner—Mark Rosenbaum
Attorney, Agent, or Firm—Synnestvedt & Lechner

[57] ABSTRACT

A press particularly adapted for use in the molding of expandable foamed materials but capable of other uses. The press includes a fixed platen supported in a horizontal position by suitable framework and a movable platen suspended beneath the fixed platen by a plurality of coil springs having their opposite ends connected to the movable platen and to the framework respectively. When the press is employed in a molding operation, the movable platen is adapted to support a mold into which the foamed material is poured while the mold is on the platen. A lifting device, such as a hydraulic jack, is positioned below the movable platen and has substantially point contact therewith whereby the movable platen may be rocked to evenly distribute the foamed material in the mold and, when the mold is brought into contact with the fixed platen by the lifting device, the movable platen will self-adjust and apply uniform pressure throughout the area of the mold.

12 Claims, 3 Drawing Figures

PATENTED OCT 22 1974          3,843,304

MOLDING PRESS

BACKGROUND OF THE INVENTION

1. Field of the Invention

The instant invention relates to a press having a primary field of use in the art of molding expansible foamed materials such as flexible or rigid urethane foams, but also being applicable for use in other fields.

2. Description of the Prior Art

In the known formation of molded objects such as replicas of wooden or other objects from expandable foams, a mold box is employed which is lined with a suitable mold material, such as silicone rubber, the liner defining a mold cavity which has the shape and surface configurations desired for the molded object. A quantity of the expandable foamed material is poured into the mold cavity, the quantity being such that its free rise volume is greater than the volume of the mold cavity. The cover is then placed on the mold box in overlying relationship to the mold cavity and maintained in such position until the foaming action which, due to the excess quantity of the foamed material, builds up a positive pressure in the mold, has been completed and the foamed material reaches at least a semirigid state.

Conventionally, the securing of the mold box cover against rising under the pressure of the foamed material has been attained by the use of clamps, such as C clamps. As will be recognized, this requires considerable tedious hand labor. Alternatively, the mold box, after the introduction of the foamed material and with the cover in mold cavity closing position, has been placed in a standard type of press, the movable platen of which is advanced toward the fixed platen to bring the mold box cover into contact with the latter and hold it in such contact with sufficient force to overcome the pressure exerted by the foamed material. It is of critical importance that the pressure applied to maintain the mold box cover against the mold box be uniform throughout the area of contact of the cover with the mold box to prevent upward movement of the cover at any point which would permit leakage of the expandable foam and hence in a nonuniform density of the molded product. The only presses heretofore available which could successfully perform such function were excessively complicated and expensive.

SUMMARY OF THE INVENTION

A principal object of the instant invention is the provision of a press particularly adapted for use in the molding of objects from expandable foams, but which finds use in other fields, which is of relatively simple and inexpensive construction, but which ensures uniform pressure of the mold box cover against the mold box.

Another object of the invention is the provision of a press attaining the foregoing object which is efficient in operation and which provides for the ready installation of a mold within the press, the introduction of the foamed material to the mold cavity while the mold is within the press, the uniform distribution of the foamed material within the mold cavity, and the ready removal of the mold following the initial setting of the foamed material.

The foregoing and other objects of the invention which will become apparent are attained by the press of the instant invention which comprises a frame structure supporting a fixed platen and a movable platen on which the mold is supported. The apparatus includes means which permits the movable platen to be rocked or otherwise manipulated to secure an even distribution of the foamed material upon its deposit in the mold cavity and to thereafter maintain the movable platen in substantial parallelism with the fixed platen as the movable platen approaches the fixed platen. Furthermore, the construction is such that the movable platen is permitted to self-adjust when the mold cover is brought into contact with the fixed platen whereby a uniform pressure is applied over the areas of the mold cover contacted by the fixed platen.

More particularly, in the preferred embodiment of the apparatus of the instant invention, the fixed platen is supported in a horizontal plane by suitable frame elements and the movable platen is suspended from elements of the frame structure to lie normally in an approximately horizontal plane below that of the fixed platen. The suspension means comprises resilient elements, particularly coil springs. To advance the movable platen toward the fixed platen, a suitable lifting device or jack is employed, such as an hydraulic piston/-cylinder combination, the latter being located beneath the movable platen and opposite the center point thereof. The lifting element of the lifting device is of a character as to permit rocking movements of the movable platen. For example, the upper end of the lifting element is such that it has a relatively small area of contact with the movable platen. The upper or fixed platen is provided with suitable apertures through which the material to be molded, such as a foamed urethane, may be discharged into an uncovered mold positioned on the lower platen.

In the operation of the press, the uncovered mold is positioned on the lower platen substantially centrally thereof and the foamed material is poured through the apertures in the upper platen into the mold cavity, the quantity so poured or discharged being such that it has a free rise volume of the mold cavity as previously mentioned. During the pouring operation and due to the spring suspension of the lower platen and the small area of contact of the lifting jack therewith, the lower platen may be readily rocked or otherwise manipulated to ensure even and complete distribution of the foamed material throughout the mold cavity. When the pouring operation has been completed, the mold cover is placed on the mold and the lifting device or jack operated to elevate the lower platen toward the fixed platen and to finally bring the mold cover against the fixed platen and hold it thereagainst under a sufficient and uniform pressure that the foamed material cannot escape from the mold as it expands to completely fill the mold cavity and thereafter to exert pressure on the mold box cover.

In a modification of the preferred embodiment described above, two of the lifters, such as hydraulic jacks, may be employed, the jacks being placed in spaced relationship on a center line of the lower platen. The operation of the modified unit is the same as described above in connection with the preferred embodiment except that the movement which can be applied to the lower platen to distribute the foamed material is limited to a rocking movement on the line defined by the points of contact of the jacks with the lower face of the movable platen.

DETAILED DESCRIPTION OF THE INVENTION

Figure 1:
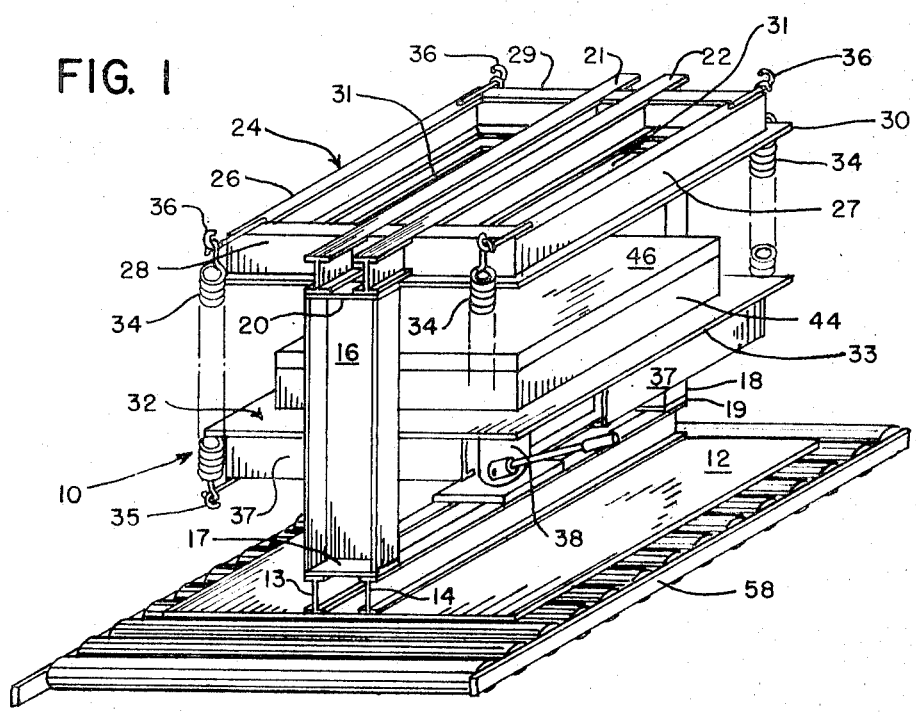
FIG. 1 is a perspective view, with parts broken away for clearness of illustration, of a press embodying the instant invention.

Referring now particularly to FIG. 1, a press incorporating the novel features of the instant invention is disclosed, the press being particularly adapted for use in connection with the molding of expandable foams, such as urethane foams, but, as will be understood, its use is not so limited and objects other than molds for expandable foams may be subjected to a pressing operation thereby. For example, the press may be used in the production of laminated materials or products. The press, indicated generally by the reference character 10, has a frame including a suitably rectangular base plate 12 to which is secured spaced I beams 13 and 14, the I beams extending longitudinally of the base plate and on opposite sides of, but relatively adjacent to the center line of the base plate. Posts 16 and 18, suitably comprising channel irons, have their lower ends secured to plates 17 and 19 respectively, which in turn are secured to I beams 13 and 14 adjacent the opposite ends of the latter. Posts 16 and 18 have their upper ends secured to plates, suitably corresponding to plates 17 and 19, but only one of which is shown at 20, which are in turn secured to I beams 21 and 22 adjacent the opposite ends thereof, the I beams being in substantially vertical alignment with I beams 13 and 14.

The frame structure additionally includes a rectangular superstructure 24 supported by I beams 21 and 22, superstructure 24 being suitably composed of sections of channel iron including side sections 26 and 27 and end sections 28 and 29, the latter being made up of elements extending from the side sections to the adjacent I beam 21 or 22 and of elements interposed between the I beams. The securement of the several parts of the frame structure to other parts is preferably effected as by weldings.

An upper platen 30 suitably comprising a steel plate is secured to superstructure 24 as by welding, the superstructure serving, in addition to its platen supporting function, as a reinforcement for the platen against stresses applied thereto in operation of the press. Suitably, the platen 30 is of rectangular configuration, as illustrated. Particularly when the press is to be employed in conjunction with a mold box in the production of molded products, platen 30 is provided with openings 31, preferably of rectangular configuration and positioned to overlie portions of the cavity of the mold box when the latter is placed on lower platen 32 with its cover removed. This permits the introduction of the material to be molded into the mold cavity of the box while the latter is within the press. The mold boxes and their covers employed for the molding of expandable foams are of such rigid character that the fact that the platen is not in continuous contact with the mold box cover throughout the area of the latter due to the openings 31, is immaterial to the securing of a uniform density of the molded product. On the other hand, when the press is to be employed as, for example, in a laminating operation, a platen of a character to be in contact with the work product throughout its area would be employed or, alternatively, as for example, where the same press is to be used for both molding and laminating, a rigid plate providing complete surface contact with the work product may be inserted to overlie the work product.

Lower movable platen 32 comprises a flat steel plate 33 of a rectangular configuration preferably corresponding to that of platen 30, the plate being suitably reinforced against distortion under pressure loads. The reinforcement, which is shown diagramatically in FIG. 1, may comprise, for example, connected channel irons 37 adjacent the margins of plate 33 and intermediate transverse members (not shown) of any desired type, one of said transverse members preferably being so located as to be contacted by the lifting device hereinafter to be described. The several elements of the reinforcement are secured together at their points of contact and to the lower face of plate 33 as by welding. Platen 32 is suspended from the superstructure by extendable coil springs 34, there being a spring relatively adjacent each of the four corners of the lower platen with one end of each spring being secured to the platen as by being connected to a hooked rod 35 projecting outwardly from the ends of lower platen 32. Similarly, the opposite end of each spring is secured to superstructure 24 as by a hooked rod 36 projecting outwardly from the ends of the superstructure and in substantially vertical alignment with its associated rod 35. The rods 35 and 36 are secured to platen 32 and to the superstructure respectively as by welding or other suitable means.

Figure 2:
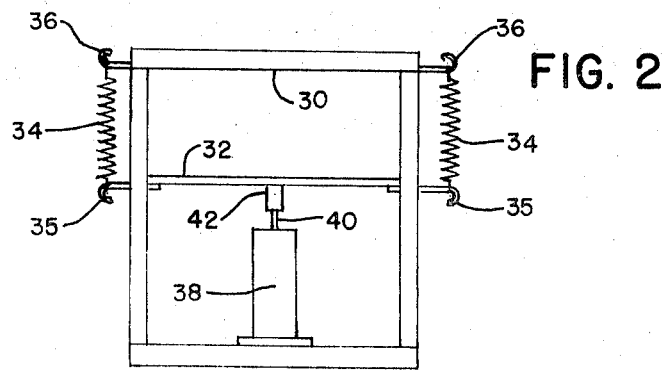
FIG. 2 is a diagrammatic side elevational view of the press of FIG. 1.

The support for the lower platen additionally includes a lifting device 38 having its base resting on and preferably secured to I beams 13 and 14 and with its lifting rod or arm 40 (see FIG. 2) positioned substantially at the central point of the lower platen 32. The lifting rod suitably terminates at its upper end in a knob 42 which has a relatively small area of contact with platen 32 to permit rocking movements of the platen. Alternatively, the lifting rod may support a plate of relatively greater area, the plate being so affixed to rod 40 that it can rock in all directions. For purposes of convenience, the contact of the lifting rod with platen 32 will, in either case, be defined by the term "substantially point contact." The height of lifting device 38 including knob 42 is such that when inactive, it will maintain lower platen 32 in a position elevated above that which would be permitted by springs 34 but which provides sufficient clearance between the platens to permit the ready placement of the work product on platen 32. The lifting device preferably is a hydraulic jack incorporating the usual piston/cylinder mechanism and may be adapted for manual or other operation. However, as will be understood, the lifting device may be of any other suitable construction having the ability to elevate the movable platen towards the fixed platen 30 and otherwise perform the required press functions.

Referring again to springs 34, the springs are so selected that when in a completely relaxed state, their lengths are less than the distance between hooks 35 and 36 when the upper surface of the object being pressed, such as a covered mold, is brought into contact with fixed platen 30. Consequently, they will remain under tension at all times during the operation of the press. Also, they are of such capacity as to retain the lower platen in a substantially horizontal plane during the complete elevation of the lower platen even though the work product is not centered on platen 32. As previously mentioned, the capacity of the springs is also such that they are only partially distended when platen 32 is in its lower most position in contact with knob 42 of the lifting device.

As a specific example, but without in any way limiting the invention thereto, the characteristics of springs 34 incorporated in a press employed in the production of molded products from foamed materials are detailed below. In the press employed, the weight of the movable platen 32 with its attendant parts was approximately 100 pounds. The mold box 44, including the necessary lining defining the mold cavity, the foamed material therein, and the cover 46, weighed approximately 12 pounds. The distance between each pair of hooks 35 and 36 to which each spring is attached was, when the closed mold box was elevated by the movable platen with its cover pressed against the fixed platen 30, about eight inches, and when the platen was in its lowest position as permitted by lifting device 38, about ten inches.

Each of the four springs 34 employed in the press, the springs being designated by the manufacturer thereof W. B. Jones Spring Co., Inc. of Cincinnati, Ohio, as its type No. 101 spring made of Wand M 12-gauge wire, had a coil diameter of 1-1/6 inches and an over-all length between the hooks thereof of seven inches when in a completely relaxed condition. The load required to initially expand each spring was ten pounds and each spring expanded one inch for each additional load of 3.95 pounds. Each spring would support a maximum load of forty pounds before reaching its elastic limit.

When the press is to be employed in the production of molded foamed products, its primary function, a mold box 44 is used, the mold box having a mold cavity (not shown) defined by a lining of a suitable material, such as a silicone elastomer, the surface of the lining being such as to provide the shape and surface configurations desired for the article to be molded. The mold box includes a readily removable cover 46.

In the use of the press, as described above, in the molding of various objects, the mold box 44 with its cover 46 removed is positioned approximately centrally of the lower platen while the latter is in its lowered position. The foamed material, such as foamed urethane, is then poured into the mold cavity through openings 31 in the upper platen 28. The pouring continues until the desired quantity of the foamed material is deposited in the mold cavity, the quantity, as aforesaid, being such that its free rise volume is greater than the capacity of the mold cavity. During the pouring operation, the lower platen 32 is rocked or otherwise manipulated, suitably by manual operation, to ensure distribution of the foamed material at the desired level throughout the mold cavity. When the pouring operation is completed, cover 46 is placed on mold box 44 and lifting device or jack 38 operated. The elevation of platen 32 is continued until the cover 46 of the mold box is brought into contact with upper fixed platen 30 and pressed thereagainst, the cover in turn pressing tightly against the upper edges of the side walls of the mold box. The lifting device 38 is selected to exert such force as to hold the cover in place and prevent emission of the foamed material from the mold cavity under the pressure exerted by the foamed material.

As will be recognized, the substantially point contact between knob 42 of the lifting device and the center of lower platen 32 and the spring suspension of the lower platen not only permits the rocking or other manipulation of the lower platen during the introduction of the foamed material into the mold cavity, but also permits the platen to self-adjust as the cover of the mold box is brought into contact with upper platen 28. As a consequence, uniform pressure is applied throughout the interior of the mold box which, in conjunction with the uniform distribution of the foamed material within the mold cavity obtained by the rocking or other manipulation of the lower platen during the pouring operation, ensures substantially uniform density of the molded product.

Figure 3:
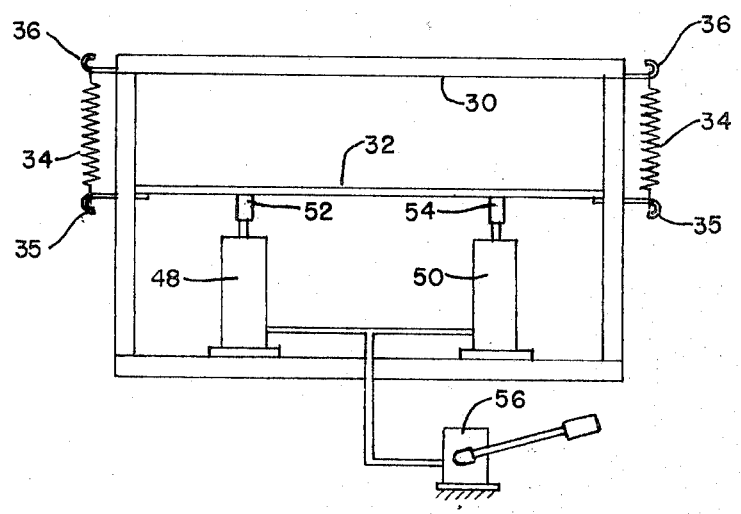
FIG. 3 is a diagrammatic elevational view similar to FIG. 2 illustrating a modification of the invention.

Referring now particularly to FIG. 3, a somewhat modified form of the press is disclosed having a principal field of use where elongate molds or other objects are to be subjected to a pressing operation. The construction is suitably the same as that described above except that the press is of relatively greater length and two of the lifting devices, indicated by the reference characters 48 and 50 respectively, are employed, the lifting devices being located in spaced positions and with their knobs 52 and 54 respectively contacting the underside of the movable platen 32 on a longitudinal center line thereof and equidistant from the center point of the platen. Also, lifting devices 48 and 50, which are preferably of the hydraulic jack type previously referred to, employ a common piston/cylinder combination indicated at 56 whereby the knobs 52 and 54 exert equal forces against platen 32.

In the use of this modification, the same steps are performed as before except that, when the press is used in a molding operation, the manipulation of the lower platen during the pouring of the faomed material is limited to a rocking motion on the longitudinal center line of the platen. Also, the self-adjustment of the movable platen upon the compression of the mold box between the platens is achieved, in part by the ability of the lower platen to rock on its longitudinal center line, and in part by the uniform pressures applied by the two lifting devices 48 and 50.

As will be appreciated, a press in accordance with either of the embodiments described above is of relatively inexpensive construction. Also, the construction is such that in the use of the press particularly in connection with the molding of expandable foamed materials, the necessary operations can be expeditiously performed. Thus, the foamed material may be poured into the mold cavity and evenly distributed throughout the cavity while the mold is supported by the lower platen. Also, the locating of posts 16 and 18, which support the superstructure 24, and of the spring suspension means for the lower platen 32, in the manner shown laterally fully exposes the space between the platens permitting ready positioning of the mold box or other objects to be pressed on platen 32 and its removal therefrom. The even distribution of the foamed material in the mold cavity, together with the self-adjustment of the movable platen relatively to the fixed platen, enables products of uniform densities to be obtained. If desired, the press or a series of the presses may be mounted on a conveyor of any suitable type such as the roller conveyor diagramatically illustrated at 58 in FIG. 1, or alternatively, the presses may be individually supported by wheels or casters, whereby, in either case, each press can be moved past a mold inserting station, a mold cavity filling station, and thence to a temporary storage area where it may remain until the completion of the foam expansion and until the foam has set sufficiently to permit removal of the mold from the press.

I claim:

1. A press comprising a fixed platen and a movable platen adapted to receive an object to be pressed therebetween and means for moving said movable platen toward said fixed platen for confining said object therebetween under pressure, said means for moving said movable platen toward said fixed platen including means providing for automatic adjustment of said movable platen to ensure substantially uniform pressure over the entire areas of said object brought into contact with said fixed platen, said last-named means including elevating means for said movable platen in contact therewith to permit rocking movement thereof and resilient means suspending said movable platen at points remote from said elevating means.

2. A press as defined in claim 1 wherein said resilient means comprises coil springs.

3. A press as defined in claim 1 wherein there is means supporting said fixed platen in a substantially horizontal plane and said resilient means supports said movable platen normally in a substantially horizontal plane in spaced relationship to the plane of said fixed platen and there is means supporting said elevating means below said movable platen.

4. A press as defined in claim 3 wherein said elevating means permitting rocking movement of said movable platen includes means having substantially point contact with said movable platen.

5. A press as defined in claim 4 wherein said elevating means is positioned to have substantially point contact with said movable platen at substantially the center point of said movable platen.

6. A press as defined in claim 3 wherein said elevating means permitting rocking movement of said movable platen includes a plurality of means spaced apart on substantially the center line of said movable platen and each including means having substantially point contact with said movable platen.

7. A press as defined in claim 3 wherein said press includes a frame structure, said fixed and movable platens are of rectangular configuration, and said resilient means suspending said movable platen comprises coil springs and means affixing first ends of said coil spring to said frame structure and means affixing second ends of said coil springs to said movable platen at points remote from the center of said movable platen.

8. A press as defined in claim 7 wherein said means affixing second ends of said coil springs to said movable platen at points remote from the center of said movable platen are located adjacent the corners of said movable platen.

9. A press as defined in claim 8 wherein said coil springs suspending said movable platen are of a capacity to permit said movable platen with a work product thereon to rest in contact said elevating means when the latter is inoperative and to maintain said movable platen in a substantially horizontal plane upon the operation of said elevating means to raise said movable platen to bring said work product into contact with said fixed platen.

10. A press as defined in claim 7 wherein said frame structure comprises a base portion, a superstructure to which said upper platen is attached, and means supporting said superstructure, from said base portion, said last-named means being positioned to provide ready access to said movable platen for the positioning therein and removal therefrom of said object.

11. A press as defined in claim 3 wherein said fixed platen includes an aperture located to overlie said object positioned on said movable platen whereby when said object is a mold having a mold cavity adapted to receive a material to be molded, said material may be discharged into said mold cavity through said aperture while said mold is positioned on said movable platen.

12. A press as defined in claim 10 wherein said fixed platen includes an aperture located to overlie said object positioned on said movable platen whereby when said object is a mold having a cavity adapted to receive a material to be molded, said material may be discharged into said mold cavity through said aperture while said mold is positioned on said movable platen.

* * * * *